United States Patent [19]
Siegel

[11] Patent Number: 6,135,735
[45] Date of Patent: Oct. 24, 2000

[54] PISTON PUMP

[75] Inventor: Heinz Siegel, Stuttgart, Germany

[73] Assignee: Robert Bosch GmbH, Stuttgart, Germany

[21] Appl. No.: 09/172,374

[22] Filed: Oct. 14, 1998

[30] Foreign Application Priority Data

Nov. 20, 1997 [DE] Germany .......................... 197 51 421

[51] Int. Cl.$^7$ ............................ F04B 39/10; F04B 53/10
[52] U.S. Cl. ........................................... 417/568; 417/567
[58] Field of Search .................... 417/274, 557, 417/567, 568; 92/60

[56] References Cited

U.S. PATENT DOCUMENTS

| | | | |
|---|---|---|---|
| 2,978,149 | 4/1961 | Rosen | 417/567 |
| 3,730,652 | 5/1973 | Roberts | 417/568 |
| 4,573,886 | 3/1986 | Maasberg et al. | 417/568 |
| 4,622,990 | 11/1986 | Norman | 417/567 |
| 4,661,050 | 4/1987 | Deminski | 417/568 |
| 4,875,741 | 10/1989 | Ozawa et al. | 303/116.4 |
| 5,605,449 | 2/1997 | Reed | 417/567 |

FOREIGN PATENT DOCUMENTS 1 95 30 012
A1    2/1997  Germany .

*Primary Examiner*—Willis R. Wolfe
*Attorney, Agent, or Firm*—Ronald E. Greigg; Edwin E. Greigg

[57] ABSTRACT

The invention relates to a piston pump for a slip-controlled hydraulic vehicle brake system. For a compact structure of the piston pump, an inlet valve and outlet valve in the form of check valves be disposed in a valve bore at a tangent to a cylinder bore of the piston pump in a pump housing. Aside from the advantage of a compact, space-saving design, the invention has the advantage of a small idle volume and thus good efficiency of the piston pump.

17 Claims, 3 Drawing Sheets

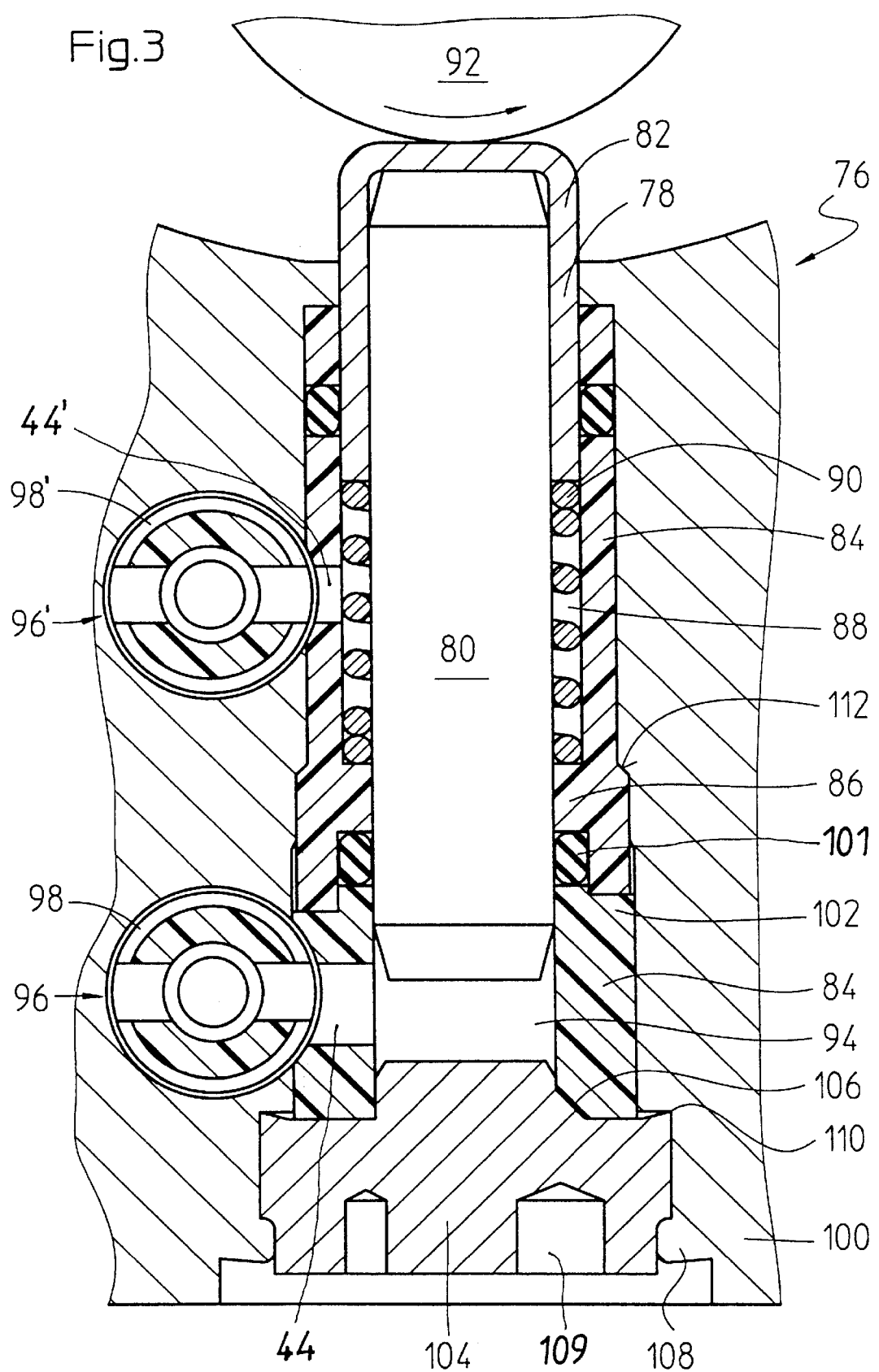

PISTON PUMP

BACKGROUND OF THE INVENTION

The invention relates to a piston pump for a vehicle brake system.

One such piston pump is known from U.S. Pat. No. 4,875,741. The known piston pump has a piston which is guided axially displaceably in a cylinder bore in a pump housing and can be driven to execute a reciprocating stroke motion in the cylinder bore by means of an eccentric drive. Inlet and outlet valves of the known piston pump are embodied as check valves and disposed externally.

OBJECT AND SUMMARY OF THE INVENTION

In the piston pump according to the invention the check valve is disposed in a valve bore that is disposed at a tangent to the cylinder bore and is spaced slightly apart from the cylinder bore in the pump housing. This arrangement of the check valve has the advantage, first that it makes a pump housing of short structure in the axial direction of the cylinder bore possible. The pump housing is compact and the piston pump takes up little space. Furthermore, the tangential valve bore can be placed quite close to the cylinder bore. Thus, a volume filled by fluid to be pumped by the piston pump, located between the cylinder bore and the check valve, is small and only slightly idle volume between the piston and the check valve can be attained. Because the idle volume is reduced, the advantage is obtained of better piston pump efficiency. The piston pump of the invention can also be well vented through the valve bore mounted at a tangent to the cylinder bore in the pump housing.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is an axial section of a second exemplary embodiment of a piston pump according to the invention.

DESCRIPTION OF THE FIRST EXEMPLARY EMBODIMENT

Figure 1:
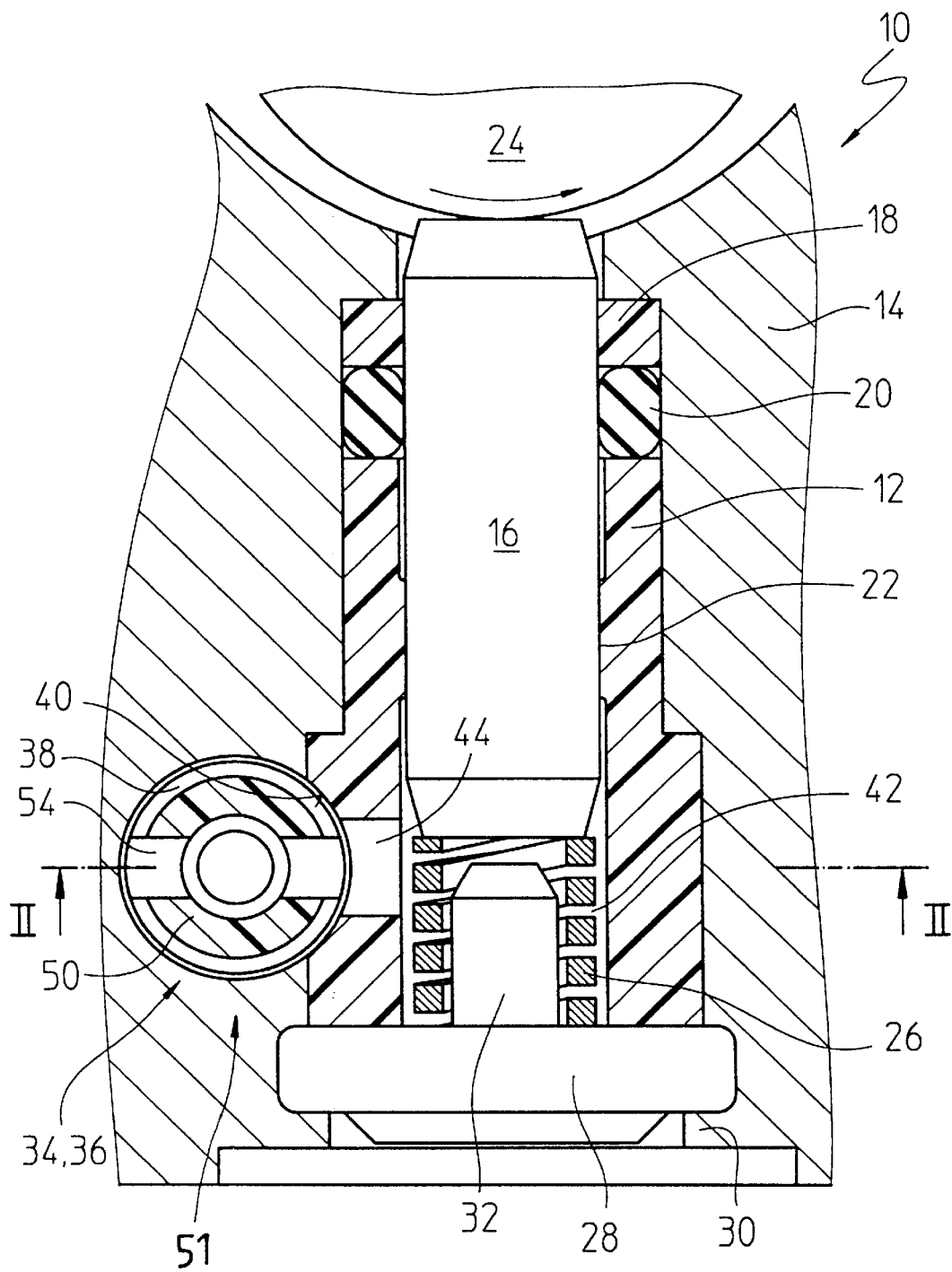
FIG. 1 is an axial section through a piston pump of the invention.
Figure 2:
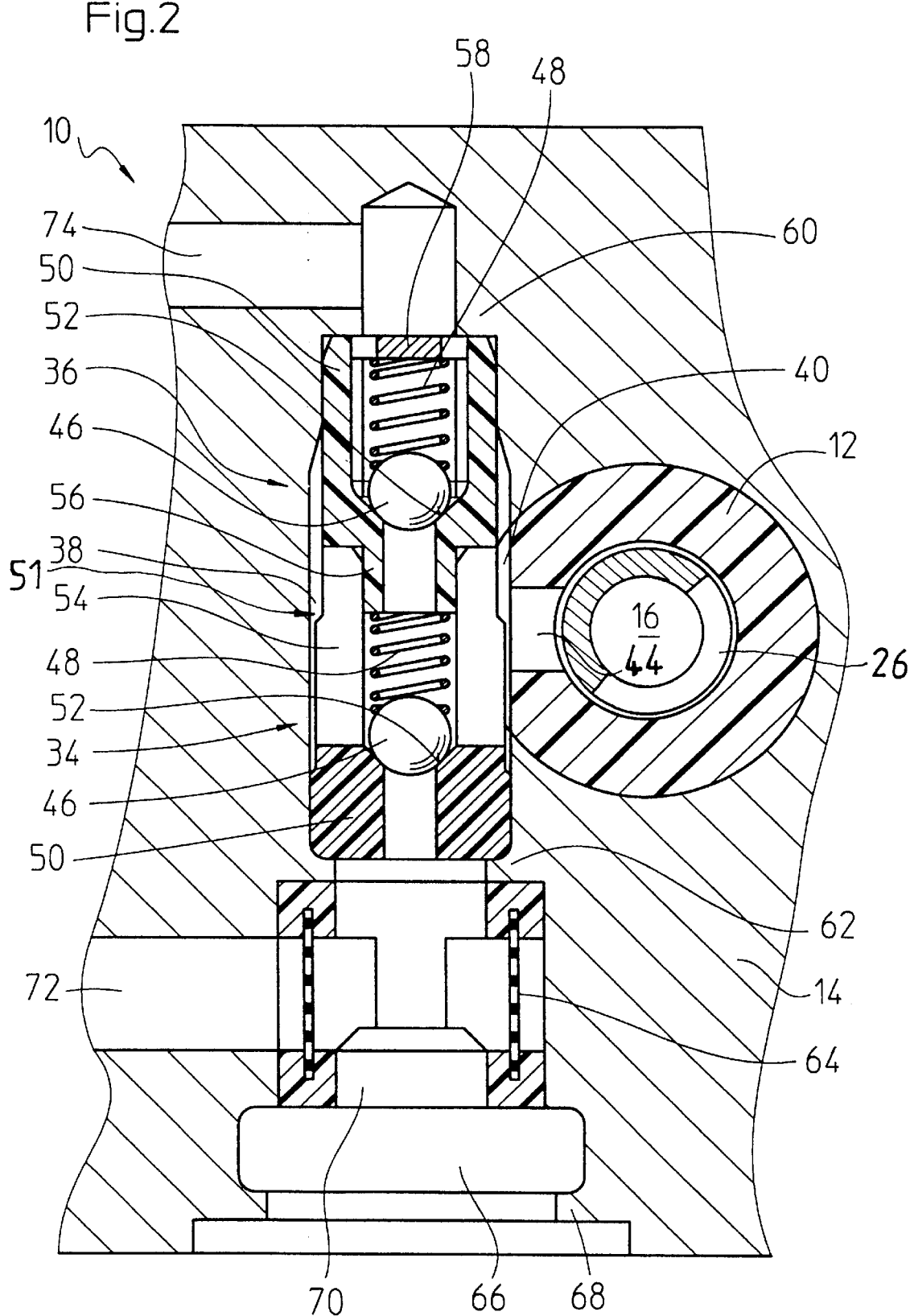
FIG. 2 is a cross section through the piston pump of FIG. 1 taken along the line II—II of FIG. 1.

The piston pump 10 of the invention, shown in FIGS. 1 and 2, has a liner 12 which is inserted into a hydraulic block, forming a pump housing 14, of a slip-controlled hydraulic vehicle brake system not otherwise shown. Other hydraulic components, such as magnet valves, hydraulic dampers, and reservoirs are inserted into the hydraulic block and connected hydraulically to one another and to the piston pump 10.

The liner 12 is a plastic injection molded part. A stemlike piston 16 is axially displaceably guided in the liner 12. The guidance of the piston 16 is effected on the one hand, on one face end of the liner 12, by means of a guide ring 18 that is inserted into the pump housing 14 on the face end of the liner 12. An O-ring 20 seals off the piston 16.

As a second guide for the piston 16, the liner 12 has a guide segment 22, which is formed by an axially short, low, encompassing taper. Axially above and below the guide segment 22, there is a narrow gap between the liner 12 and the piston 16.

On the side toward the guide and O-ring 18, 20 of the liner 12, an eccentric element 24 is provided, which can be driven to rotate by an electric motor and serves in a manner known per se to drive the piston 16 to execute a stroke motion. A helical compression spring acting as a piston restoring spring 26, disposed on a face end of the piston 16 remote from the eccentric element 24 in the liner 12, keeps the piston 16 in contact with the circumference of the eccentric element 24. To reduce an idle volume in the piston pump 10, the piston restoring spring 26 has a rectangular winding cross section. The idle volume is the volume remaining in the liner 12 once the piston 16, at the end of its pumping stroke, assumes its position retracted farthest into the liner 12. In general terms, the reduction in the idle volume with the piston restoring spring 26 is attained by providing that the winding faces toward one another of the piston restoring spring are at least approximately complementary to one another, so that when the piston restoring spring 26 has been compressed by the piston 16, the interstices between the spring windings are as small as possible.

A face end of the liner 12 remote from the eccentric element 24 is sealed in pressure-tight fashion by a disklike closure element 28, which is mounted with a caulking 30 in the pump housing 14. The piston restoring spring 26 is braced against the closure element 28. A tanglike positive displacement body 32 protrudes from the closure element 28 into an interior of the piston restoring spring 26. The positive displacement body 32 reduces the idle volume of the piston pump 10 as well. The positive displacement body 32 may also (not shown) be disposed on the piston 16. Together with the piston restoring spring 26 having the rectangular winding cross section, the positive displacement body 32 reduces the idle volume of the piston pump 10 inside the liner 12, when the piston 16 has been thrust into the liner 12 to virtually zero. The reduction in size of the idle volume improves the efficiency of the piston pump 10. Another advantage is that the piston pump 10 can be readily vented.

As an inlet valve 34 and outlet valve 36, the piston pump 10 has two spring-loaded check valves, which are inserted into a valve bore 38 (see FIG. 2) mounted at a tangent to the cylinder bore in the pump housing 14. The term "cylinder bore" is understood to be the bore or opening provided in the pump housing 14 and containing the piston 16. The valve bore 38 is spaced only slightly apart from the cylinder bore. The valve bore 38 intersects the liner 12 (FIG. 1). At the point of intersection with the valve bore 38, the liner 12 has a cylindrical, tangential chamfer, which is in alignment with the valve bore 38. As a result, the valves 34, 36 are located close to a positive displacement chamber 42 of the piston pump 10; they communicate with the positive displacement chamber 42 via a short, radial connecting bore 44 in the liner 12. The spatially closely packed arrangement of the inlet valve 34 and outlet valve 36 directly on the positive displacement chamber 42 with a short connecting bore 44, and the fact that there is only a single connecting bore 44 for both the pump inlet and the pump outlet, make for a small idle volume of the piston pump 10 and thus improve its efficiency and assure good ventability of the piston pump 10.

Both valves 34, 36 have spherical valve closing bodies 46, which are pressed each by one valve closing spring 48, in the form of a helical compression spring, against a valve seat mounted in the interior of a respective sleeve 50, in which the valve closing body 46 and the valve closing spring 48 are disposed. The sleeve 50 of the inlet valve 34 is provided with longitudinal slots 54, which allow a fluid flow into and away from the connecting bore 44.

The two sleeves 50 are joined together to make a valve cartridge 51. The sleeve 50 of the outlet valve 36 has a collar 56, which engages the sleeve 50 of the inlet valve 34 in the manner of a fit, onto which collar the sleeve 50 of the inlet valve 34 is press-fitted. The inlet valve 34 and outlet valve 36 are in this way joined to one another by a press-fit in a frictionally engaged manner and form the valve cartridge 51 that includes the inlet valve 34 and the outlet valve 36.

The valve closing spring 48 of the inlet valve 34 is braced against the collar 56 of the outlet valve 36. For bracing the valve closing spring 48 of the outlet valve 36, a star-shaped disk 58 with axial openings is press-fitted into the sleeve 50 of the outlet valve 36. The valve cartridge 51 that includes the two sleeves 50 forms a torsion protection means for the liner 12 and assures that the connecting bore 44 provided in the liner 12 will discharge into the valve bore 38. Accommodating the inlet valve 34 and outlet valve 36 in the common valve cartridge 51 has the advantage of good manipulability of the valves 34, 36; the valves 34, 36 can be inspected outside the pump housing 14 before being installed, and their installation in the pump housing 14 is facilitated by their being assembled outside. The sleeves 50 are plastic injection molded parts. In the axial direction, the valve cartridge 51 is fixed on the side of the outlet valve 36 by an annular shoulder 60 and on the side of the inlet valve 34 in the valve bore 38 by a caulking 62.

Upstream of the inlet valve 34, a hollow-cylindrical filter screen 64 is inserted into the valve bore 38 and is retained therein by a closure disk 66. By means of a caulking 68, the closure disk 66 is retained in the valve bore 38 and seals it off in pressureproof fashion. The filter screen 64 is mounted on a low tang 70 that is integral with the closure disk 66. A pump inlet and outlet are effected by an inflow bore 72 and outflow bore 74, respectively, that are mounted in the pump housing 14 and discharge radially on both ends into the valve bore 38.

DESCRIPTION OF THE SECOND EXEMPLARY EMBODIMENT

The piston pump of the invention can also be embodied as a multichannel pump, as explained in terms of the two-channel pump 76 shown in FIG. 3. To avoid repetition, below essentially only the differences from the piston pump 10 shown in FIGS. 1 and 2 will be explained. For the rest, the descriptions of FIGS. 1 and 2 may be referred to. The piston pump 76 shown in FIG. 3 has a stepped piston 78, which comprises a pinlike piston part 80 onto which a piston sleeve 82, closed on one end is press-fitted; the sleeve has a length somewhat less than half that of the piston part 80. The stepped piston 78 is displaceably supported in a liner 84. The liner 84 of the piston pump 76 has an inward-protruding, encompassing annular guide portion 86, which has a radial height equivalent to the thickness of a wall of the piston sleeve 82. The stepped piston 78 rests with its piston part 80 on the guide portion 86 and is guided thereby. Enclosed between the piston part 80, the liner 84, the piston sleeve 82, and the guide portion 86 is an annular jacket space, which forms a second positive displacement chamber 88 of the two-channel pump 76.

Inserted into the positive displacement chamber 88 is a helical compression spring acting as a piston restoring spring 90, which is braced on the guide portion 86 of the liner 84 and presses the stepped piston 78, with its piston sleeve 82, against the circumference of an eccentric element 92, which can be driven to rotate by an electric motor and which serves to drive the stepped piston 78 to a reciprocating stroke motion. A first positive displacement chamber 94 of the two-channel pump 76, on the face end of the stepped piston 78 remote from the eccentric element 92, has an only slightly longer piston displacement than the piston stroke, so that the idle volume of the positive displacement chamber 94 is virtually zero.

The two-channel pump 76 has a first valve cartridge 96 and a second valve cartridge 96'. The valve cartridge 96 is embodied identically to the valve cartridge 51, shown in FIG. 2, of the first exemplary embodiment. That is, the valve cartridge 96 includes one inlet valve and one outlet valve. The second valve cartridge 96' is also identically embodied to the valve cartridge 51. Thus the second valve cartridge 96 also includes one inlet valve and one outlet valve. Because both valve cartridges 96 and 96' look identical in longitudinal section to the valve cartridge 51 (FIG. 2) of the first exemplary embodiment, no attempt has been made to show the longitudinal section of the valve cartridges 96, 96'. The two valve cartridges 96, 96' are each inserted into a respective valve bore 98 and 98', and these bores are mounted at a tangent to the cylinder bore of the piston pump 76, in a hydraulic block forming a pump housing 100. The two valve bores 98, 98' intersect the liner 84. The first valve bore 98 creates an imaginary first chamfer of the outer circumference of the liner 84. The connecting bore 44 connects the first chamfer to the first positive displacement chamber 94. The second valve bore 98' creates an imaginary second chamber of the outer circumference of the liner 84. A connecting bore 44' connects the second chamfer to the second positive displacement chamber 88. Both chamfers are already made on the liner 84 before the liner is inserted into the pump housing 100.

The valve bores 98, 98' extend transversely to the cylinder bore in which the piston 78 is closed. The spacing between the longitudinal axis of the valve bore 98 and the longitudinal axis of the cylinder bore is as slight as possible, on the one hand, so that the valve bore 98 intersects the liner 84 on its outer circumference extensively enough that the inlet valve and the outlet valve of the valve cartridge 96 can communicate with the first positive displacement chamber 94, via the connecting bore 44 in the liner 84. This arrangement yields an especially small idle volume between the positive displacement chamber 94 and the inlet valve and outlet valve of the valve cartridge 96. On the other hand, the spacing is selected to be at least large enough that the valve cartridge 96 is no hindrance to the motion of the piston 78. Since the valve cartridge 96 extends through the chamfer provided on the outer circumference of the liner 84 for the valve cartridge 96, it is assured that the connecting bore 44 is oriented in the direction of the valve bore 98. The valve cartridge 96 forms a torsion protection means for the liner 84. The same is correspondingly true for the spacing between the longitudinal axis of the valve bore 98' and the longitudinal axis of the cylinder bore. Equally, the spacing is also the same as in the first exemplary embodiment (FIGS. 1, 2) between the longitudinal axis of the valve bore 38 and the longitudinal axis of the cylinder bore containing the piston 16.

The valve bores 38 and 98, 98' are provided such that they are located above the cylinder bore containing the respective pistons 16 and 78 once the piston pump 10 and 76, respectively, is completely installed in its intended operating position. In the operating position, the cylinder bore preferably extends horizontally, and the valve bores 38, 98, 98' preferably extend horizontally above the cylinder bore. This assures that any air present in the positive displacement chambers 42 (FIG. 1) and 88 and 94 (FIG. 3) can escape. In plan view, the valve bores 38, 98, 98' extend perpendicular to the cylinder bore.

The liner 84 is embodied in two parts and is put together from two tubular pieces. The liner 84 is split radially on a side of the guide portion 86 remote from the eccentric element 92. A sealing ring 101 is placed in a groove between the two pieces of the liner 84. The sealing ring 101 divides the two positive displacement chambers 88 and 94 from one another.

During an extension stroke of the piston 78, the first positive displacement chamber 94 increases in size, and pressure medium from a first inflow channel (not shown) is aspirated into the positive displacement chamber 94, through the inlet valve provided in the valve cartridge 96. At the same time, the second positive displacement chamber 88 increases in size as well, and pressure medium from a second inflow channel (also not shown) is aspirated into the second positive displacement chamber 88, through the inlet valve provided in the second valve cartridge 96'.

During a retraction stroke of the piston 78, the first positive displacement chamber 94 decreases in size, and pressure medium is positively displaced out of the positive displacement chamber 94 into a first outflow channel (not shown), through the outlet valve provided in the valve cartridge 96. At the same time, the second positive displacement chamber 88 decreases in size as well, and pressure medium is positively displaced out of the second positive displacement chamber 88 into a second outflow channel (also not shown), through the outlet valve provided in the second valve cartridge 96'.

As needed, the piston pump is designed such that the two inflow channels are hydraulically separated from one another or communicate hydraulically with one another. In the two hydraulically separated positive displacement chambers 88 and 94, pressures of different magnitude can prevail.

To assure an angularly correct alignment of the two pieces of the liner 84, one of the pieces of the liner 84 has a protrusion 102, which engages a complementary recess of the other part of the liner 84. The angular position of the liner 84 with respect to a closure element 104 is likewise assured with a triangular protrusion 106 of the closure element 104, which engages a complementary recess of the liner 84. The closure element 104 is cylindrical; it closes the liner 84 on a side remote from the eccentric element 92. With a caulking 108, the closure element 104 is held in pressure-tight fashion in the pump housing 100. The closure element 104 and the two pieces of the liner 84 are firmly put together before being built into the pump housing 100. On the outward-pointing face end of the closure element 104, one larger and one smaller blind bore are provided. The two blind bores form a marking 109, so that the liner 84 can be installed in the pump housing 100 at the correct angle in a way that is apparent from the outside. A corresponding marking (not shown) is preferably provided for the closure element 28 (FIG. 1) as well.

The closure element 104 has an encompassing cutting edge 110, with which the closure element 104 digs in on being press-fitted into the pump housing 100. The cutting edge 110 assures that both the closure element 104 and the liner 84, the latter with a conical annular shoulder 112, firmly contact the pump housing 100. This prevents axial play of the liner 84.

Both exemplary embodiments of the invention described and shown have the common feature that their individual parts can be produced largely without metal-cutting machining and thus can be made quickly and inexpensively. In the piston pump proposed according to the invention, a single-channel piston pump with one positive displacement chamber (FIGS. 1, 2) or a multichannel piston pump with a plurality of hydraulically separate positive displacement chambers (FIG. 3), for instance two in number, is obtained at minimal engineering effort, minimal structural volume, and maximal functional reliability.

The foregoing relates to preferred exemplary embodiments of the invention, it being understood that other variants and embodiments thereof are possible within the spirit and scope of the invention, the latter being defined by the appended claims.

I claim:

1. A piston pump, comprising a pump housing with at least one cylinder bore, a piston axially displaceably guided in each said at least one cylinder bore which is driven to execute an axially reciprocating stroke motion, a check valve in communication with each said at least one cylinder bore, each said check valve (34, 36; 96, 96') being disposed in a valve bore (38, 98, 98') which is at a tangent to the cylinder bore with which it is in communication and is spaced only slightly apart from the cylinder bore in the pump housing (14; 100), and a cylindrical filter screen (64) disposed in each valve bore.

2. A piston pump, comprising a pump housing with a cylinder bore, a piston that is axially displaceably guided in the cylinder bore which is driven to execute an axially reciprocating stroke motion, a check valve, the check valve (34, 36; 96, 96') is disposed in a valve bore (38, 98, 98') which is at a tangent to the cylinder bore and is spaced only slightly apart from the cylinder bore in the pump housing (14; 100), said piston pump (10; 76) having a liner (12; 84), which is inserted into the pump housing (14; 100), said liner being intersected at a circumferential face by the valve bore (38; 98) and having a tangential, cylindrical chamfer (40), which is aligned with the valve bore (34; 98).

3. The piston pump according to claim 2, in which the piston pump (76) is a multichannel pump.

4. A piston pump, comprising a pump housing with a cylinder bore, a piston that is axially displaceably guided in the cylinder bore which is driven to execute an axially reciprocating stroke motion, a check valve, the check valve (34, 36; 96, 96') is disposed in a valve bore (38, 98, 98') which is at a tangent to the cylinder bore and is spaced only slightly apart from the cylinder bore in the pump housing (14; 100), and a piston restoring spring (26) disposed in a positive displacement chamber (42), said piston restoring spring having winding faces facing one another and being approximately complimentary to one another.

5. The piston pump according to claim 4, in which the piston restoring spring (26) has a rectangular winding cross section.

6. A piston pump, comprising a pump housing with a cylinder bore, a piston that is axially displaceably guided in the cylinder bore which is driven to execute an axially reciprocating stroke motion, a check valve, the check valve (34, 36; 96, 96') is disposed in a valve bore (38, 98, 98') which is at a tangent to the cylinder bore and is spaced only slightly apart from the cylinder bore in the pump housing (14; 100), and a cylindrical filter screen (64) disposed in the valve bore.

7. The piston pump according to claim 6, in which the piston pump has a positive displacement body (32), which is disposed in a positive displacement chamber (42; 94) of the piston pump (10; 76).

8. The piston pump according to claim 7, in which the piston pump (76) is a multichannel pump.

9. The piston pump according to claim 6, in which the piston pump (10; 76) has two check valves (34, 36; 96, 96'), which are jointly disposed in the valve bore (38; 98, 98').

10. The piston pump according to claim 9, in which the two check valves (34, 36; 96) are accommodated in a valve cartridge (51, 96, 96') that is inserted into the valve bore (38; 98, 98').

11. The piston pump according to claim 9, in which the piston pump (76) is a multichannel pump.

12. The piston pump according to claim 6, in which the piston pump (76) is a multichannel pump.

13. The piston pump according to claim 12, in which a plurality of valve bores (98, 98'), at a tangent to the cylinder bore, are provided at a slight spacing from the cylinder bore, and check valves (96) which communicate with a respective positive displacement chamber (88, 94) are disposed in the valve bores.

14. The piston pump according to claim 13, in which the piston pump (76) has a closure element (104), which is press-fitted into the pump housing (100), closing the cylinder bore in pressure-tight fashion on one side, and that the closure element (104) has an encompassing cutting edge (110), with which it digs into the pump housing (100) on being press-fitted.

15. The piston pump according to claim 12, in which at least one of the positive displacement chambers (88) of the piston pump (76) is defined by a piston sleeve (82) mounted on the piston (78, 80).

16. The piston pump according to claim 15, in which the piston pump (76) has a closure element (104), which is press-fitted into the pump housing (100), closing the cylinder bore in pressure-tight fashion on one side, and that the closure element (104) has an encompassing cutting edge (110), with which it digs into the pump housing (100) on being press-fitted.

17. The piston pump according to claim 12, in which the piston pump (76) has a closure element (104), which is press-fitted into the pump housing (100), closing the cylinder bore in pressure-tight fashion on one side, and that the closure element (104) has an encompassing cutting edge (110), with which it digs into the pump housing (100) on being press-fitted.

* * * * *